US011675653B2

(12) United States Patent
Baheti et al.

(10) Patent No.: US 11,675,653 B2
(45) Date of Patent: Jun. 13, 2023

(54) MANAGEMENT AND REMEDIATION OF DATABASE ISSUES

(71) Applicant: salesforce.com, inc., San Francisco, CA (US)

(72) Inventors: Shainesh Baheti, Hyderabad (IN); Anand Vardhan, Hyderabad (IN); Aishanya Singh, Greater Noida (IN); Venkatesh Bora, Hyderabad (IN); Arjun Kumar Bachuwar, Nirmal (IN)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/317,308

(22) Filed: May 11, 2021

(65) Prior Publication Data

US 2022/0365839 A1 Nov. 17, 2022

(51) Int. Cl.
*G06F 11/00* (2006.01)
*G06F 11/07* (2006.01)
*G06F 16/21* (2019.01)
*G06F 11/34* (2006.01)
*G06F 11/30* (2006.01)

(52) U.S. Cl.
CPC ...... *G06F 11/0793* (2013.01); *G06F 11/0709* (2013.01); *G06F 11/0754* (2013.01); *G06F 11/0766* (2013.01); *G06F 11/3086* (2013.01); *G06F 11/3409* (2013.01); *G06F 16/21* (2019.01); *G06F 2201/80* (2013.01)

(58) Field of Classification Search
CPC ............. G06F 11/0703; G06F 11/0706; G06F 11/0709; G06F 11/0727; G06F 11/0751; G06F 11/0754; G06F 11/0766; G06F 11/0772; G06F 11/0775; G06F 11/0781; G06F 11/0784; G06F 11/0793; G06F 11/3086; G06F 11/3409; G06F 16/21; G06F 2201/80; G06F 2201/81
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |

(Continued)

*Primary Examiner* — Anthony J Amoroso
(74) *Attorney, Agent, or Firm* — Lowenstein Sandler LLP

(57) ABSTRACT

Systems and methods are described identify a database metric value associated with a database instance storing a dataset associated with a user system. A database issue is detected in view of a determination that the database metric value satisfies a condition. In response to satisfaction of the condition, a set of user action metrics associated with the user system is collected from one or more data monitoring systems. At least one notification communication is generated including at least a portion of the set of user action metrics and information identifying the database issue. The at least one notification communication is transmitted to a remediation execution system configured to execute, using the at least a portion of the set of user action metrics and information identifying the database issue, a remedial action in response to the database issue.

20 Claims, 6 Drawing Sheets

(56) References Cited

U.S. PATENT DOCUMENTS

| | | |
|---|---|---|
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson |
| 8,438,422 B2* | 5/2013 | Matsumoto ......... G06F 11/0748 714/26 |
| 10,452,463 B2* | 10/2019 | Hiran ................... G06F 11/079 |
| 10,776,241 B1* | 9/2020 | Christensen ........... G06N 20/00 |
| 11,003,641 B2* | 5/2021 | Dundjerski ......... G06F 11/0793 |
| 11,269,750 B2* | 3/2022 | Boyapalle ........... G06F 11/3452 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0026212 A1* | 2/2006 | Tsukerman ............ G06F 16/21 |
| 2015/0039555 A1* | 2/2015 | Rao ................... G06F 16/2379 707/607 |
| 2021/0011797 A1* | 1/2021 | Robison ............. G06F 11/0757 |
| 2021/0081382 A1* | 3/2021 | Colrain .................. G06F 16/21 |

* cited by examiner

FIGURE 2

Database Contention Management System 150

Database Issue Detection Module 152

| User System | Database instance | Database Metric | Threshold Level | Condition Satisfied? |
|---|---|---|---|---|
| User system A | Database instance 1 | Metric 1 value | Threshold level 1A | Yes |
| User system A | Database instance 1 | Metric 2 value | Threshold level 2A | No |
| User system B | Database instance 2 | Metric 1 value | Threshold level 1B | Yes |
| User system C | Database instance 3 | Metric 2 value | Threshold level 2C | Yes |
| ... | | ... | | |
| User system X | Database instance 3 | Metric P value | Threshold level PX | Yes |

FIGURE 4

| Database Instance | User System Impacted | Database Issue Type | Relevant set of user action metrics | Remediation Execution System(s) to Notify |
|---|---|---|---|---|
| Database Instance 4 | User System P | Row lock contention wait | User Action Metrics ABC | Remediation Execution Systems 1 and 3 |
| Database Instance 7 | User System L | Connection pool wait | User Action Metrics DEF | Remediation Execution System 1 and 2 |
| Database Instance 1 | User System B | Index contention wait | User Action Metrics GHI | Remediation Execution System 3 |
| Database Instance 9 | User System V | GC wait | User Action Metrics JKL | Remediation Execution System 2 |
| Database Instance 3 | User System G | Concurrency wait | User Action Metrics XYZ | Remediation Execution System 1 |

MANAGEMENT AND REMEDIATION OF DATABASE ISSUES

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate to data recovery solutions, and, more specifically, to the management of a migration of workflow data.

BACKGROUND

Databases may be employed to store large volumes of data objects. The database can be configured to include multiple instances or points of deployment (PODS) including database management components (e.g., an application server, database server, a search and file system, etc.) configured to manage one or more data stores including data. Each database instances can include data associated with multiple different user systems (e.g., customer systems).

The database instances can experience various issues relating to the access of the stored data that require remediation. For example, the databases instances can be subject to contention or concurrency issues where multiple processes or computing instances compete for access to a same index or data block at a same time. In certain cases, block or data contention can be caused by frequent index or table scans or frequent updates. Disadvantageously, database issues associated with one user system can cause performance degradation associated with the shared database instances that impacts other user systems (e.g., reduced performance of user requests on a same partition of the shared database instance).

As a result, user systems can experience various concurrency-related issues, such as exceeding a concurrent request limit, record or row locking, and other database-related that can significantly impact the user system's front end operations. For example, concurrency issues can lead to the building up of database sessions due to database waits caused by index contention waits, row lock waits, garbage collection waits, concurrency waits, etc. that can result in the loss of business for those user systems.

To identify and address these database issues, extensive time-consuming manual efforts are performed by multiple different teams to analyze the issues and provide a solution. Frequently, coordination of these multiple teams is needed to identify a root cause and produce a final remediation to address the problems on behalf of the one or more impacted user systems.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

FIG. 2 illustrates an example database contention management system including an example database issue detection module to detect database issues associated with one or more databases according to one or more implementations.

FIG. 4 illustrates an example data structure identifying information relating to the detection and remediation of database issues by a database contention management system according to one or more implementations.

DETAILED DESCRIPTION

Figure 1:
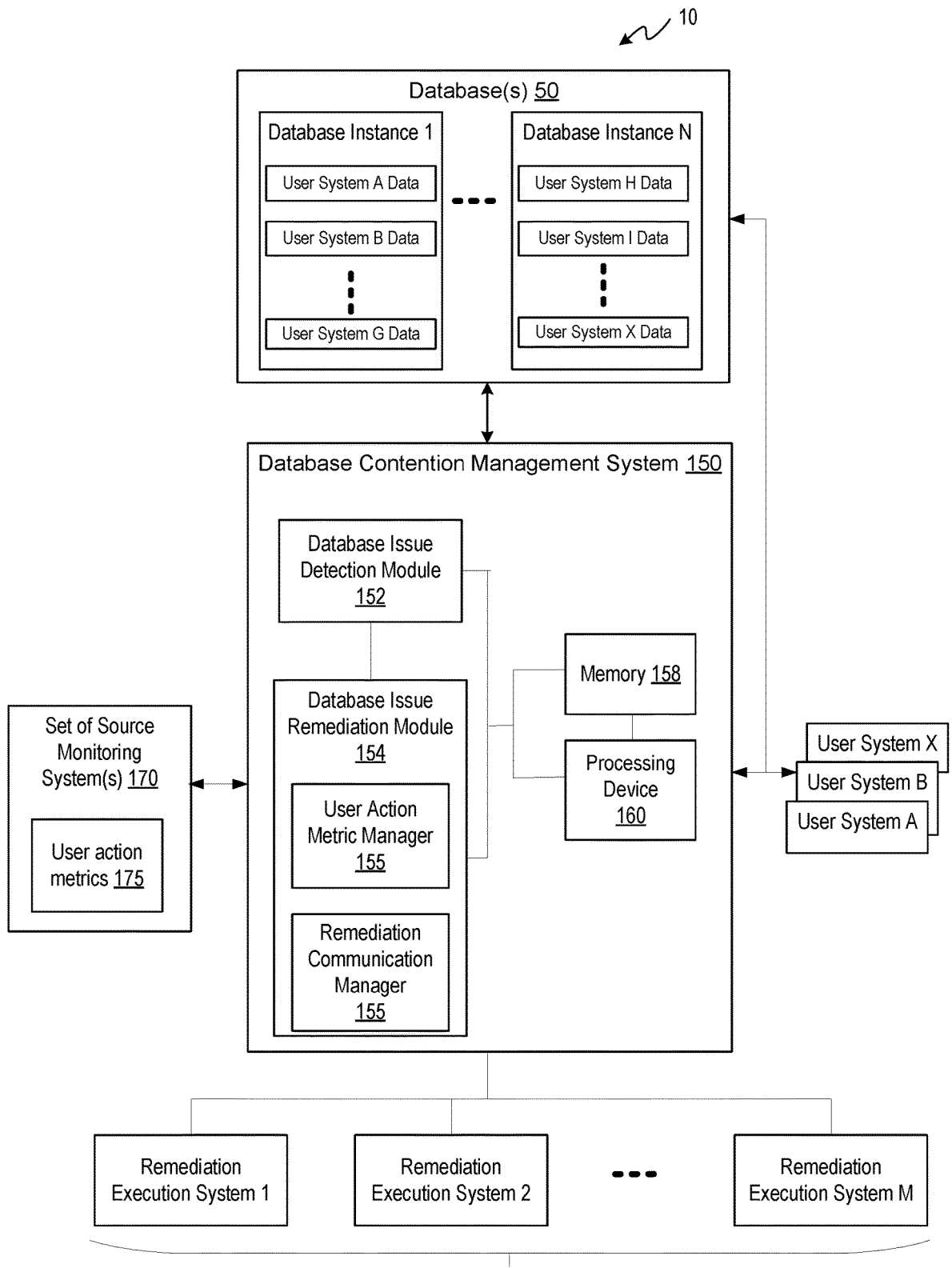
FIG. 1 shows a block diagram of an example environment in which a database contention management system can be used according to one or more implementations.

The implementations described herein relate systems and methods for managing one or more databases storing data associated with one or more user or customer systems (herein referred to as a "user system"). The system (also referred to as a "database management system") identifies a database issue associated with a database. The database management system identifies the database issue by monitoring the database for one or more database metrics (e.g., a database session wait time, a database row lock, a connection pool wait time). The collected or identified database metrics are compared to a corresponding metric threshold level to determine if a condition is satisfied. In an embodiment, the condition is satisfied if the measured database metric value is greater than the metric threshold.

In an embodiment, in response to identifying the database-related issue (also referred to as a "database issue" or "database event"), the database management system collects user-related database usage metrics (e.g., data identifying database related actions taken by a user system) from one or more source monitoring systems. In an embodiment, the database management system sends one or more communications to the one or more source monitoring systems to identify a set of relevant data or metrics relating to the identified database issue. In an embodiment, the data management system identifies one or more specific metrics to be retrieved from one or more source monitoring systems that relate to and can be used to remediate the identified database issue or event.

In an embodiment, upon identification of the set of relevant metrics (also referred to as "user action metrics"), the database management system identifies one or more remediation execution systems configured to execute a remedial action (e.g., throttling a specific activity or request of a user, terminate a database session, generating a notification to a user system to terminate, suspend, or adjust an activity related to the database issue, etc.) corresponding to the database event. In an embodiment, the database management system generates one or more communications for transmission to the respective one or more remediation systems. The communications each include an identified portion of the set of relevant metrics selected by the database management system based on the corresponding remediation systems (e.g., a system associated with a particular team responsible for taking remedial or responsive actions in view of a database issue.

In an embodiment, the database management system further generates reports identifying the database issue, relevant user action metrics, remedial actions taken, etc. for diagnostic purposes. In an embodiment, the system can generate a graphical user interface displaying a generated report associated with the database issue.

According to embodiments, the database management system enables the automated identification and processing of a database issue (e.g., a database contention or concurrency issue). In an embodiment, the system and method perform automated remediation processing by collecting relevant user action data for correlation to the identified database issue. In an embodiment, the system and method automatically generate and transmit remediation-related communications to one or more designated remedial action groups or systems and further provide a graphical user interface displaying customized reports including database issues and related metrics.

In an embodiment, the database management system can implement the database issue monitoring and remediation for data associated with a particular or target user system that is stored in a database instance that is shared with multiple other user systems (e.g., the single database instance includes data associated with multiple different user systems including the target user system; also referred to as a point of deployment (POD)). In an embodiment, the database management system can maintain, manage and execute target user system-specific rules relating to issue monitoring (e.g., target user-specific thresholds, remediation plans, remediation team notification settings, etc.). According to embodiments, the database management system can be implemented to identify, address, and remediate other concurrency issues relating to the execution and performance of other computing stacks. In an embodiment, the execution of target user-specific management rules enables remediation of database issues relating to a shared database instance (e.g., an instance including data associated with multiple different user systems including the target user system) to remediate the particular database issue and provide protection for the overall health of the database instance on behalf of the multiple user systems.

Conventional systems require highly manual-intensive process whereby a user (e.g., a user associated with the user or customer system impacted by the database issue associated with the user's data) to identify a problem and alert a database manager. For example, the user may be required to open a ticket corresponding to the database-related issue for processing by the data manager. In response, a human operator reviews the ticket and, in many instances, engages in a manual process of escalating the issue to one or more management "teams". Following this manual escalation (e.g., identification of one or more appropriate teams based on the initial human operator's review of the issue, determining the one or more management teams for escalation purposes, etc.) based on specialized database-related knowledge and experience, which are tasked with analyzing the issue and taking a corresponding remedial action. These conventional approaches require database managers to perform time-intensive processing including multiple delays and bottlenecks to address database issues which cause a significant interruption of business operations impacting multiple user systems.

The implementations described herein address these and other limitations of current systems by providing functionality to dynamically identify one or more database issues by monitoring the database for one or more database metrics. The collected or identified database metrics are compared to a corresponding metric threshold level to determine if the measured database metric value is greater than the metric threshold, without the need for a user system to self-diagnose and report the issue.

In response to identifying the database-related issue, the database management system collects user action metrics (e.g., user-related database usage metrics associated with actions taken by a user system with respect to a database instance) from one or more source monitoring systems. In an embodiment, the database management system sends one or more communications to the one or more source monitoring systems to identify a set of relevant data or metrics relating to the identified database issue. In an embodiment, the data management system identifies one or more specific metrics to be retrieved from one or more source monitoring systems that relate to and can be used to remediate the identified database issue or event. Upon identification of the set of relevant user action metrics, the database management system identifies one or more remediation execution systems configured to execute a remedial action (e.g., throttling a specific activity or request of a customer, terminate a database session, etc.). In an embodiment, the database management system automatically generates and transmits one or more communications to the respective one or more remediation systems.

As used herein, the terms "database issue", "database event", "database contention issue" or "database concurrency issue" refer generally to an issue or event wherein a database concurrency metric satisfies a condition associated with a database concurrency threshold. As used herein, the term "remedial action" generally refers to an action or event executed by a remediation execution system (e.g., a designated individual or team) to remediate an identified database issue. As used herein, the term "user action metric(s)" refers generally to one or more metrics associated with actions, activities, or operations performed by a customer system with respect to a database that are associated with a cause of a database issue or event.

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as an "example" or "exemplary" is not necessarily to be construed as preferred or advantageous over other aspects or designs. Rather, use of the words "example" or "exemplary" is intended to present concepts in a concrete fashion.

In addition, the articles "a" and "an" as used herein and in the appended claims should generally be construed to mean "one or more" unless specified otherwise or clear from context to be directed to a singular form. Reference throughout this specification to "an implementation," "one implementation," "some implementations," or "certain implementations" indicates that a particular feature, structure, or characteristic described in connection with the implementation is included in at least one implementation. Thus, the appearances of the phrase "an implementation," "one implementation," "some implementations," or "certain implementations" in various locations throughout this specification are not necessarily all referring to the same implementation.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "defining," "identifying," "computing," "generating," "applying," "causing," "detecting," "performing," "analyzing," "determining," "enabling," "modifying," "transforming," "extracting," "populating," "updating," "mapping," "storing," "prioritizing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which a workflow migration management system in a computing environment including a source system and a target system. Moreover, the implementations are applicable to other systems and environments including, but not limited to, client-server models, mobile technology and devices, wearable devices, and on-demand services.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Any of the software components or functions described in this application can be implemented as software code to be executed by one or more processors using any suitable computer language such as, for example, C, C++, Java™ (which is a trademark of Sun Microsystems, Inc.), or Perl using, for example, existing or object-oriented techniques. The software code can be stored as non-transitory instructions on any type of tangible computer-readable storage medium (referred to herein as a "non-transitory computer-readable storage medium"). Examples of suitable media include random access memory (RAM), read-only memory (ROM), magnetic media such as a hard-drive or a floppy disk, or an optical medium such as a compact disc (CD) or digital versatile disc (DVD), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

The disclosure also relates to apparatuses, devices, and system adapted/configured to perform the operations herein. The apparatuses, devices, and systems may be specially constructed for their required purposes, may be selectively activated or reconfigured by a computer program, or some combination thereof.

FIG. 1 shows a block diagram of an example of a computing environment 10 in which a database contention management system 150 can be used in accordance with some implementations. The environment 10 includes one or more databases 50 configured to store data associated with a user system (also referred to as a "user data", "user dataset" or a "dataset associated with a user system") that is managed by the database contention management system 150. In an embodiment, the databases 50 include a storage location or memory configured to store, manage, and perform database operation to provide access to user datasets to enable the respective user systems to perform one or more operations (e.g., business functions or operations) using the user dataset.

As shown in FIG. 1, the databases 50 can include multiple database instances (e.g., database instance 1 . . . database instance N) each configured to store a dataset associated with one or more user systems. In the example shown in FIG. 1, the database instance 1 stores datasets associated with multiple different user systems (e.g., user system A data, user system B data, . . . user system G data) and the database instance N stores a dataset associated with one or more other user systems (e.g., user system H data, user system I data, . . . user system X data). As shown in FIG. 1, the respective user systems (e.g., user system A, user system B, . . . user system X) are communicatively connected to the databases 50 and the database contention management system 150.

In an embodiment, the database contention management system 150 can include one or more elements, components, or modules to perform various functions and operations, as described in detail herein. Example components include a database issue detection module 152 and a database issue remediation module 154 including a user action metric manager 155 and a remediation communication manager 155. In an embodiment, the database contention management system 150 is configured to interface with one or more user systems (e.g., user system A through user system X), a set of remediation execution systems (e.g., remediation execution system 1, remediation execution system 2, . . . remediation execution system M), and a set of source monitoring systems 170. In an embodiment, the database contention management system 150 can communicate or interact with the databases 50, set of source monitoring systems 170, one or more user systems, and one or more remediation execution systems via one or more suitable networks and communication protocols. The network can include any network or combination of networks of systems or devices that communicate with one another. For example, the network 14 can be or include any one or any combination of a local area network (LAN), wide area network (WAN), telephone network, wireless network, cellular network, point-to-point network, star network, token ring network, hub network, or other appropriate configuration. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The database contention management system 150 includes non-transitory computer-readable storage media (e.g., memory 158) having instructions stored thereon that are executable by or used to program a server or other computing system (or collection of such servers or computing systems) to perform some of the implementation of processes described herein. For example, the program code can include instructions for migrating workflows to intercommunicate and to process web pages, applications, and other data and media content as described herein. In some implementations, the program code can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, DVDs, CDs, microdrives, magneto-optical discs, magnetic or optical cards, nanosystems (including molecular memory integrated circuits), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™ JavaScript, ActiveX, any other scripting language, such as VBScript, and many other programming languages as are well known.

The database contention management system 150 also includes a memory 158 and one or more processing devices 160 configured to execute program code (e.g., code stored in the memory 158) for implementing various functions of the database contention management system 150. In some other implementations, environment 10 may not have all of these components or systems, or may have other components or systems instead of, or in addition to, those listed above.

In some implementations, the database contention management system 150 can be a standalone program or application executable by one or more computer systems (e.g., one or more servers) communicatively connected to the data store 50 and one or more user systems 100. In some implementations, the database contention management system 150 can be a program or application executable via a larger system configured to manage the one or more database 50. In some implementations, the database contention management system 150 can include functionality that is configured as a web service accessible by the one or more user systems.

According to implementations of the present disclosure, the database issue detection module 152 is configured to monitor the databases 50 and identify one or more database metrics. In an embodiment, the database metrics can include one or more activities, operations, events, etc. associated with the databases 50. For example, the database metrics can include one or more of a database session wait time, a database row lock, a connection pool wait time, etc. that relate to the operation or performance of the databases 50. In an embodiment, the database issue detection module 152 polls the databases 50 (e.g., at a predetermined frequency) to identify and collect the database metrics associated with one or more user systems.

In an embodiment, the database issue detection module 152 maintains one or more threshold levels associated with the one or more database metrics. In an embodiment, the database issue detection module 152 can include a data structure storing metric-based threshold levels (e.g., a first threshold level associated with a first database metric, a second threshold level associated with a second database metric, etc.). In an embodiment, the database issue detection module 152 can maintain user system-specific threshold levels such that a threshold level is established (e.g., customized) on a per-user system and per-database metric basis.

In an embodiment, the database issue detection module 152 is configured to compare the database metric value (e.g., database session wait time) to a corresponding threshold level (e.g., a threshold value associated with the database session wait time) to determine if a condition is satisfied. In an embodiment, the condition is satisfied if the measured or detected database metric value is greater than or equal to the corresponding threshold level.

FIG. 2 illustrates an example database contention management system 200 including an example database issue detection module 152 maintaining a data structure including a set of threshold levels (e.g., threshold level 1A, threshold level 2A, threshold level 1B, threshold level 2C, . . . threshold level PX) associated with respective database metrics (e.g., metric 1, metric 2, metric P) detected or identified with respect to one or more database instances storing data corresponding to different user systems (e.g., user system A, user system B, user system C, . . . user system X). In an embodiment, the database issue detection module 152 manages user system-specific and database metric-specific threshold levels (e.g., threshold level 1A is applied to determine whether metric 1 value corresponding to the database instance storing the user system A data satisfies a condition, such as whether the metric 1 value is greater than or equal to the threshold level 1A).

As illustrated in FIG. 2, the database issue detection module 152 monitors the various database instances (e.g., database instance 1, database instance 2, database instance 3, etc.) and detects one or more database metrics. In an embodiment, the monitoring and detecting of database metric values can be performed periodically. In an embodiment, the detecting of a database metric value that satisfies a condition can be done automatically such that the occurrence of the condition triggers an alert from the database instance to the database issue detection module 152 including the monitored or detected database metric value.

Advantageously, as depicted in FIG. 2, the database issue detection module 152 can maintain sets of threshold levels that are established and/or customized on a user-system and database metric-system basis. In an embodiment, a user system can select or otherwise customize a desired threshold level for a corresponding database metric (e.g., to establish a tolerance level associated with a particular database metric for a database instance storing the user system's data). In an embodiment, the threshold levels can be adjusted, changed, updated, deleted, or added in accordance with inputs or instructions from a user system or by the database issue detection module 152. For example, the database issue detection module 152 can employ a machine learning algorithm to analyze historical database activities and database issue metrics and formulate corresponding changes or updates to a threshold level in view of an identified pattern or trend.

With reference to FIG. 1, in an embodiment, in response to the identification of a database issue (e.g., satisfaction of the condition associated with a database metric corresponding to a database instance and a user system dataset, the database issue detection module 152 can provide an indication of the database issue to the database issue remediation module 154. In an embodiment, the database issue remediation module 154 includes a user action metric manager 155 configured to collect user-related database usage metrics (e.g., metrics identifying database-related actions taken by the user system in connection with the database issue) from one or more source monitoring systems of a set of source monitoring systems 170. In an embodiment, the source monitoring systems 170 include one or more systems configured to monitor or track real-time data associated with one or more systems of the user system. In an embodiment, the data monitored by the set of source monitoring systems 170 can include data relating to one or more systems (e.g., end-user systems) of the user system that access or utilize the user system dataset stored by the databases 50. Example source monitoring systems 170 include, but are not limited to, the Splunk™ data platform, the Argus monitoring platform, a real-time POD monitoring system, etc.

In an embodiment, the database management system sends one or more communications to the one or more source monitoring systems to identify a set of relevant data or metrics relating to the identified database issue. In an embodiment, the user action metric manager 155 collects user metric data (e.g., using SQL requests to collect data held in a relational database management system or stream processing in a relational data stream management system) that relate to the one or more database issue metrics (e.g., database waits, data manipulation language (DML) operations, contention objections, execution of flow and transaction control statements (e.g., Salesforce Apex-based entry points), uniform resource identifier (URI) requests, Java Stack traces, etc.) for use in diagnosing a cause associated with the detected database issue. For example, the database management system can determine that multiple sessions are getting piled up on index contention waits and collect information relating to an endpoint URI which is causing the issue, a list of DMLs that are being executed, and/or which is executing, a database index associated with the database from which the contention originated, etc.

In an embodiment, the user action metric manager 155 collects one or more user action metrics 175 from the one or more source monitoring systems 170 that are related to the detected database issue. In an embodiment, the user action metric manage 155 maintains a data structure including a mapping between a respective database issue and one or more user metrics (e.g., user metrics ABC, user metrics DEF, user metrics GHI, etc.) that are associated with the database issue. For example, the user action metric manager 155 can employ a data structure that identifies that user metric DEF is to be collected from the one or more source monitoring systems 170 in response to the detection of a database metric 1 value exceeding a threshold level 1A associated with the user system A.

With reference to FIG. 1, in an embodiment, the collected user action metrics 170 associated with the database issue associated with a database instance storing data associated with a particular user system is provided by the user action metric manager 155 to the remediation communication manager 155. In an embodiment, the remediation communication manager 155 is configured to identify one or more remediation execution systems 180 (e.g., remediation execution system 1, remediation execution system 2, . . . remediation execution system M) configured to execute a remedial action corresponding to the identified database issue or event. In an embodiment, the respective remediation execution systems 154 can be configured to execute one or more particular remedial actions (e.g., throttling a specific activity or request of a user system, terminating a database session, etc.) In an embodiment, the remediation communication manager 155 generates one or more communications for transmission to the respective one or more remediation execution systems 180.

The communications can each include an identified portion of the set of user action metrics 175 selected by the remediation communication manager 155 based on the corresponding remedial action in the one or more notification communications sent to the one or more remediation execution systems 180. In an embodiment, the database contention management system 150 can manage a set of multiple remediation execution systems 180 associated with each user system based on selections or designations made by the corresponding user system. For example, user system A can designate remedial execution system 1 to perform remedial action 1 (e.g., throttling usage of a database instance) in response to database issue X, remedial execution system 2 (e.g., terminating one or more database sessions) to perform remedial action 2 in response to database issue X, and remedial execution system M to perform remedial action 3 in response to database issue X. In view of these example designations, the remediation communication manager 155 can generate and transmit notification communications to the respective remedial execution systems including a corresponding portion of the user action metrics 175 and information identifying the database issue. In an embodiment, the remediation communication manager 155 is configured to generate a diagnostic report including the identified database metrics and user action metrics. In an embodiment, the diagnostic report can be accessed (e.g., via an interface or via a communication) by one or more systems including the impacted user system, one or more of the remediation execution systems 180, etc. In an embodiment, the notification communication can be any suitable format or protocol, including an electronic message (e.g., an email or instant message), a telephone communication, a messaging platform communication, etc.

In an embodiment, in response to the notification communication received from the remediation communication manager 155, the one or more respective remedial execution systems 180 can execute a corresponding remedial action in view of the portion of user action metrics to address the identified database issue. In an embodiment, the remediation execution systems 180 can provide communications back to the database contention management system which include information relating to the remedial action that was executed (e.g., a status of the execution of the remedial action, an actor associated with the execution of the remedial action, a date/time of the remedial action, a result of the remedial action, etc.).

Figure 3:
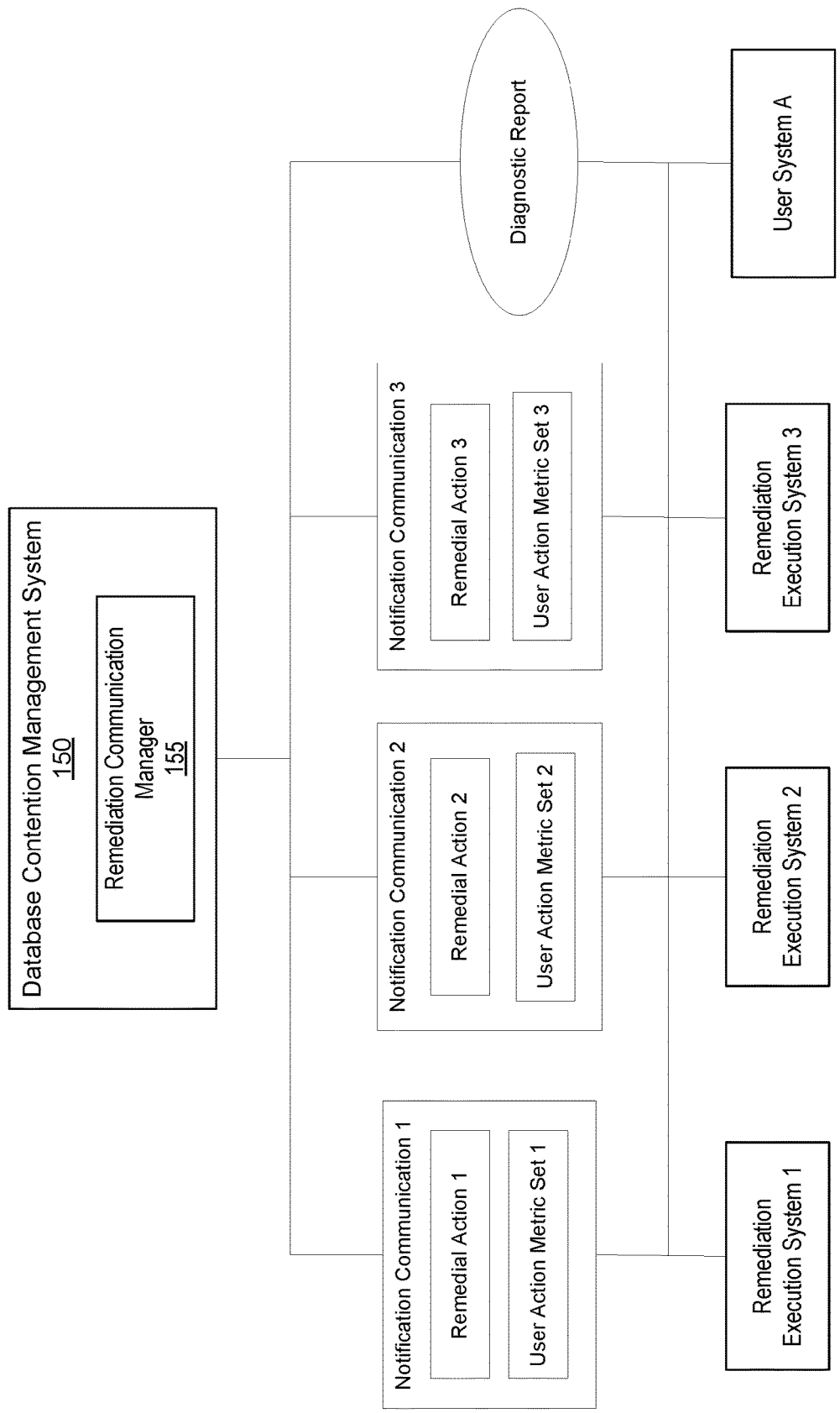
FIG. 3 illustrates an example database contention management system including an example remediation communication manager to generate and transmit notification communications to one or more remediation execution systems in response to detection of a database issue according to one or more implementations.

FIG. 3 illustrates an example database contention management system 150 including an example remediation communication manager 155 configured to perform the above-described function in response to the identification of one or more database issues. In the example shown in FIG. 3, a database issue is identified corresponding to a database instance storing data associated with user system A. In this example, the remediation communication manager 155 identifies a set of remediation execution systems that are to be notified of the database issue by way of a generated communication. As shown in FIG. 3, the remediation communication manager 155 generates respective notification communications (e.g., Notification Communication 1, Notification Communication 2, and Notification Communication 3) to be transmitted to the respective remediation execution systems (e.g., remediation execution system 1, remediation execution 2, and remediation execution system 3). As shown, the respective notification communications can include an identification of the desired or requested remedial action (e.g., remedial action 1, remedial action 2, or remedial action 3) to be taken by the respective remediation execution systems and at least a portion (e.g., a portion relevant to the remedial action) of the user action metrics. (e.g., user action metric set 1, user action metric set 2, and user action metric set 3).

As illustrated in FIG. 3, the remediation communication manager 155 can further generate and provide access to a diagnostic report including, for example, information identifying the database issue, at least a portion of the user action metric set, information associated with the one or more remedial actions that are executed (e.g., information identifying the remediation execution system, a type of remedial action taken, a timestamp associated with the execution of the remedial action, a result of the remedial action, etc.). In an embodiment, the diagnostic report generated by the remediation communication manager 155 can identify the database issue, relevant customer action metrics, remedial actions taken, etc. for diagnostic purposes. In an embodiment, the remediation communication manager 155 can generate a graphical user interface displaying a generated report associated with the database issue. In an embodiment, the diagnostic report can be provided to a user system (e.g., user system A of FIG. 3) and/or one or more remediation execution systems (e.g., remediation execution system 1, remediation execution system 2, remediation execution system 3 of FIG. 3).

FIG. 4 illustrates an example data structure 400 maintained by a database contention management system (e.g., database content management system 150 of FIG. 1), in accordance with embodiments of the present disclosure. As shown, the data structure 400 includes a mapping or association between various information elements relating to the management of database issues in one or more databases including one or more database instances storing data associated with multiple different user systems. Example information maintained in the data structure 400 can include an identification of a database instance associated with a database issue, a user system impacted by a database issue, a database issue type, a relevant set or portion of user action metrics relating to remediation of a corresponding database issue, and an identification of one or more remediation systems to be notified of the database issue.

As illustrated in FIG. 4, the database contention management system can identify a database issue type (e.g., row lock contention wait, connection pool wait, index contention wait, global cache (GC) wait, concurrency wait) that is identified by monitoring the one or more databases for database metric values and comparing those values to a corresponding threshold level (e.g., as described above in detail with reference to FIG. 2). In an embodiment, the database contention management system identifies information identifying the database instance experiencing the identified database issue type and one or more user systems that are impacted by the database issue.

In an embodiment, a set of user action metrics associated with the one or more impacted user systems are collected from one or more source monitoring systems. As shown in FIG. 4, the database contention management system further identifies a relevant set of the user action metrics that are to be included in a notification communication to an identified remediation execution system. In an embodiment, the database contention management system can identify the one or more remediation execution systems to be notified based on the database issue type and the impacted user system.

Figure 5:
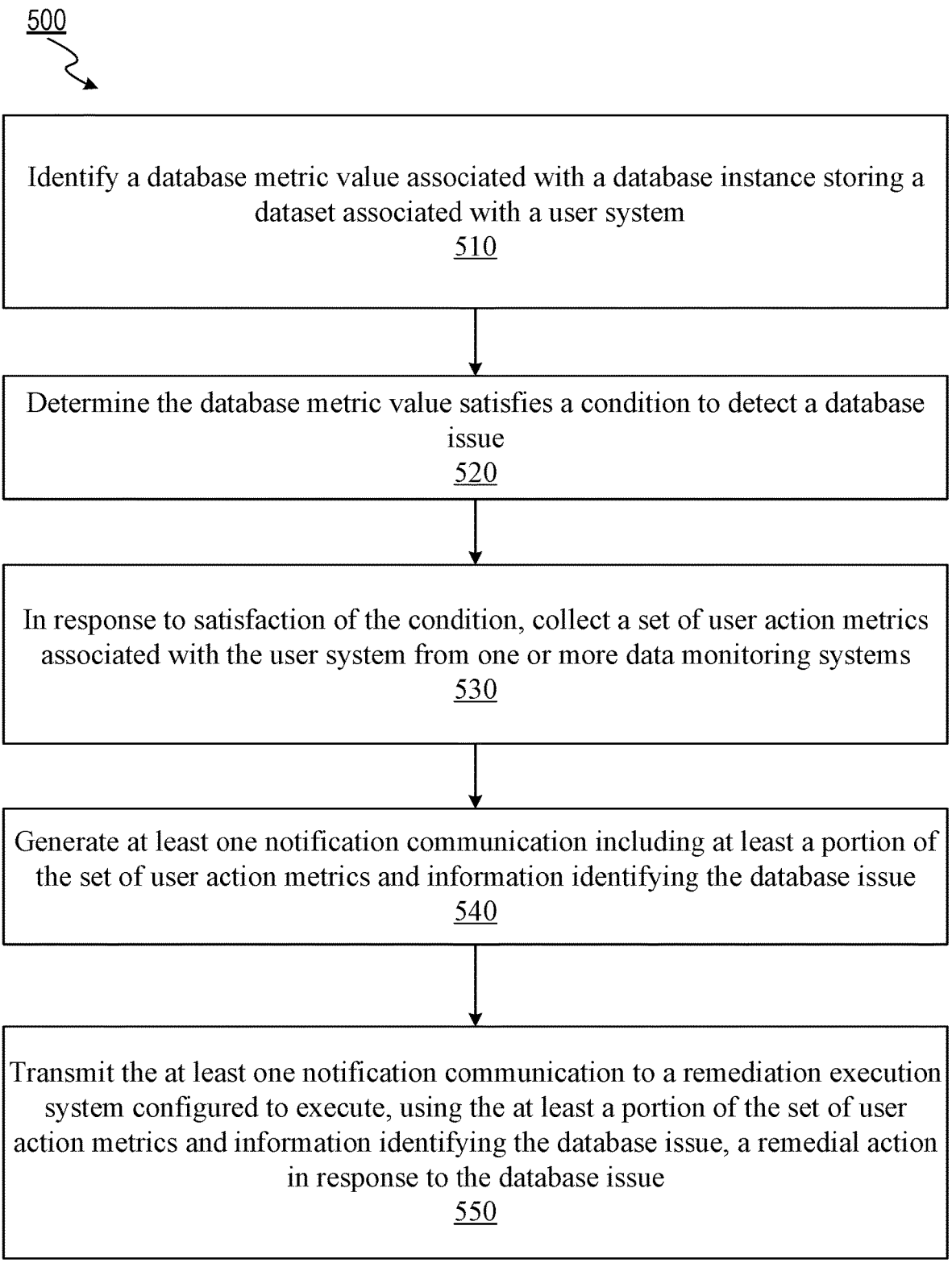
FIG. 5 is a flow diagram illustrating an exemplary method for transmitting a notification communication to a remediation system in response to the identification of a database issue according to one or more implementations.

According to embodiments, the database contention management system enables the automated identification and processing of a database issue. In an embodiment, the system and method perform automated remediation processing by collecting relevant user action data for correlation to the identified database issue. In an embodiment, the database contention management system automatically generates and transmit remediation-related communications to one or more designated remediation execution systems and further provides a graphical user interface displaying customized reports including database issues and related metrics FIG. 5 is a flow diagram illustrating exemplary method 500 for managing a database issue associated with a database instance of a database on behalf of a user system. The method 500 may be performed by processing logic comprising hardware (e.g., circuitry, dedicated logic, programmable logic, microcode, etc.), software (such as instructions run on a processing device), or a combination thereof. In some implementations, the method 500 may be performed by one or more processing devices of a workflow migration system (e.g., the database contention management system 150 of FIG. 1). Although the implementations of the method 200 are discussed with respect to the database contention management system 150, it is to be understood that these implementations are merely exemplary, and that other devices may perform some or all of the functionality described At block 510, the processing logic identifies a database metric value associated with a database instance storing a dataset associated with a user system. In an embodiment, the database metric value can be a value corresponding to a database metric that is associated with the operation of a database including one or more database instances. In an embodiment, the database metric value can be determined by polling or otherwise retrieving sets of database metric values from the one or more databases. In an embodiment, example database metrics include, but are not limited to, a row lock contention wait time, a connection pool wait time, an index contention wait time, a global cache wait time, a concurrency wait time, etc. In an embodiment, the processing logic can periodically (e.g., at any suitable predetermined frequency) poll the databases to monitor and identify a set of current database metric values.

At block 520, the processing logic determines the database metric value satisfies a condition to detect a database issue. In an embodiment, the processing logic compares the database metric value to a threshold level value to determine if the condition is satisfied. In an embodiment, the condition is satisfied if the database metric value is greater than or equal to the threshold level value. In an embodiment, a threshold level value can be established for each of the different database metrics. In an embodiment, a threshold level value can further be established on a per-user-system basis, such that a particular user system (e.g., user system A of FIG. 1) can be associated with a set of threshold level values that are compared to the identified database metric values to determine if one or more conditions are satisfied. In an embodiment, a separate condition can be established for each database metric using a corresponding threshold level value. In an embodiment, the corresponding threshold level values can be customized or established for each user system of multiple user systems that share a database or database instance. For example, user system A can be associated with threshold level 1A relating to database metric 1 and user system B can be associated with threshold level 1B relating to database metric 1, where threshold level 1A and threshold level 1B are not equal.

At operation 530, in response to satisfaction of the condition, the processing logic collects a set of user action metrics associated with the user system from one or more data monitoring systems. In an embodiment, in view of the detection of the database issue, a corresponding set of user action metrics is collected to enable the identification of a root cause or computing context associated with the database issue. In an embodiment, the user action metrics can include any metric associated with the user system's utilization of the database that relates to the identified database issue. Example user action metrics include, but are not limited to, information identifying database waits associated with the user system, related DML operations, contention objections, execution of flow and transaction control statements, associated URI requests, Java Stack traces, etc.

In an embodiment, the processing logic is configured to respond to the detection of the database issue (e.g., in view of one or more database metric values exceeding a corresponding threshold level value) by collecting user action metrics (e.g., information identifying actions or activities associated with the user system that are correlated to the detected database issue).

At operation 540, the processing logic generates at least one notification communication including at least a portion of the set of user action metrics and information identifying the database issue. In an embodiment, the processing logic can identify one or more remediation execution systems that are configured to receive the at least one notification communication. In an embodiment, the one or more remediation execution systems (e.g., the recipients of the notification communication) are identified based on the detected database issue and the impacted user system. In an embodiment, each user system can designate or otherwise identify a set of one or more remediation execution systems that are to be notified upon the occurrence of a particular database issue. For example, user system B can provide instructions indicating that remediation execution systems 1 and 3 are to be notified upon the detection of a row lock contention wait time exceeding a threshold wait time (e.g., the detected database issue).

In an embodiment, the processing logic determines a relevant portion of the set of user action metrics to include in the notification communication. In an embodiment, the processing logic can determine the portion of user action metrics in view of the desired remedial action to be executed by the identified remediation execution system. For example, the processing logic can collection determine that a first portion (e.g., user action metric DEF) of a set of collected user action metrics (e.g., user action metrics ABC, DEF, GHI, and JKI) is to be included in a notification communication to be transmitted to remediation execution system 2 configured to execute a corresponding remedial action (e.g., database session termination).

At operation 550, the processing logic transmit the at least one notification communication to a remediation execution system configured to execute, using the at least a portion of the set of user action metrics and information identifying the database issue, a remedial action in response to the database issue. In an embodiment, multiple different remediation execution systems can be established to execute one or more remedial actions. In an embodiment, each user system can designate, define, and configure a set of remediation execution systems to receive notification communications relating to detected database issues. In an embodiment, respective remediation execution systems can be configured to execute one or more designated remedial actions in response to a detected database issue. In an embodiment, different remediation execution systems can be designated to execute different remedial actions.

In an embodiment, the transmission of the at least one notification communication be performed using any suitable communication platform or protocol. For example, the at least one notification communication can be transmitted via an electronic communication (e.g., one or more emails, an electronic messaging service, etc.). Advantageously, the transmission of the notification communication can be automated to enable a corresponding remedial action to be executed in a time-efficient manner.

In an embodiment, the one or more remediation execution systems can provide a responsive communication which includes information relating to the remedial action, such as a description of the remedial action, a status of the remedial action (e.g., pending, completed, etc.), an identification of a root cause of the database issue, etc. In an embodiment, the database contention management system can use information or feedback received from the one or more remediation execution systems to track historical database issue data and use the historical data to manage, adjust, or update one or more parameters of the database content management system (e.g., adjust a threshold level value, update one or more user action metrics associated with a database issue, update notification communication settings associated with one or more remediation execution systems, etc.).

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring instructions for performing such methods to computing devices. The term "article of manufacture," as used herein, is intended to encompass a computer program accessible from any computer-readable device or storage media.

The illustrative examples shown in FIGS. 1-5 are set forth to assist in understanding the embodiments described herein and should not be construed as specifically limiting the embodiments described and claimed herein. Such variations, including the substitution of all equivalents now known or later developed, which would be within the purview of those skilled in the art, and changes thereto are to be considered to fall within the scope of the embodiments incorporated herein.

Figure 6:
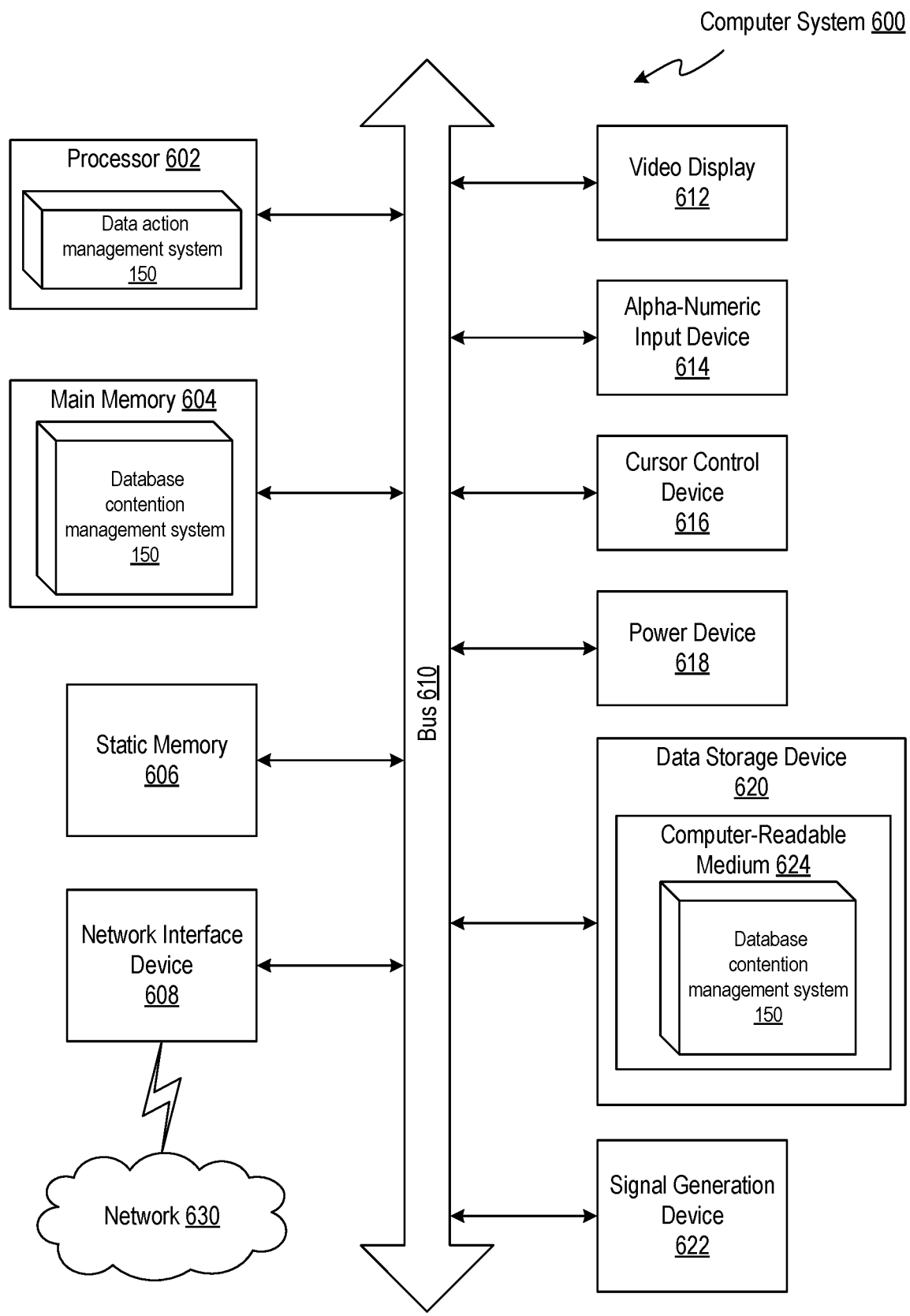
FIG. 6 illustrates a diagrammatic representation of a machine in the exemplary form of a computer system within which one or more implementations may be carried out.

FIG. 6 illustrates a diagrammatic representation of a machine in the exemplary form of a computer system 600 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 600 may be utilized by or illustrative of any of the electronic components described herein (e.g., any of the components illustrated in or described with respect to FIGS. 1-5).

The exemplary computer system 600 includes a processing device (processor) 602, a main memory 604 (e.g., ROM, flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 620, which communicate with each other via a bus 610.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions for performing the operations and steps discussed herein, such as some or all of the functionality described with respect to the database contention management system 150.

The computer system 600 may further include a network interface device 608. The computer system 600 also may include a video display unit 612 (e.g., a liquid crystal display (LCD), a cathode ray tube (CRT), or a touch screen), an alphanumeric input device 614 (e.g., a keyboard), a cursor control device 616 (e.g., a mouse), and a signal generation device 622 (e.g., a speaker).

Power device 618 may monitor a power level of a battery used to power the computer system 600 or one or more of its components. The power device 618 may provide one or more interfaces to provide an indication of a power level, a time window remaining prior to shutdown of computer system 600 or one or more of its components, a power consumption rate, an indicator of whether computer system is utilizing an external power source or battery power, and other power related information. In some implementations, indications related to the power device 618 may be accessible remotely (e.g., accessible to a remote backup management module via a network connection). In some implementations, a battery utilized by the power device 618 may be an uninterruptable power supply (UPS) local to or remote from computer system 600. In such implementations, the power device 618 may provide information about a power level of the UPS.

The data storage device 620 may include a computer-readable storage medium 624 (e.g., a non-transitory computer-readable storage medium) on which is stored one or more sets of instructions (e.g., software) embodying any one or more of the methodologies or functions described herein, such as some or all of the functionality described with respect to the backup management component 310. These instructions may also reside, completely or at least partially, within the main memory 604 and/or within the processor 602 during execution thereof by the computer system 600, the main memory 604, and the processor 602 also constituting computer-readable storage media. These instructions may further be transmitted or received over a network 630 via the network interface device 608. While the computer-readable storage medium 624 is shown in an exemplary implementation to be a single medium, it is to be understood that the computer-readable storage medium 624 may include a single medium or multiple media (e.g., a centralized or distributed database, and/or associated caches and servers) that store the one or more sets of instructions.

In the foregoing description, numerous details are set forth. It will be apparent, however, to one of ordinary skill in the art having the benefit of this disclosure, that the present disclosure may be practiced without these specific details. While specific implementations have been described herein, it should be understood that they have been presented by way of example only, and not limitation. The breadth and scope of the present application should not be limited by any of the implementations described herein, but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A method comprising:
    polling, by a processing device, a database instance to identify a database metric value associated with the database instance storing a dataset associated with a user system;
    determining the database metric value satisfies a condition indicating a database issue;
    in response to satisfaction of the condition, collecting, from one or more data monitoring systems, a set of user action metrics identifying one or more database actions caused to be executed by the user system, wherein the set of user action metrics are collected based at least in part on a mapping with the database issue;
    generating at least one notification communication responsive to at least a portion of the set of user action metrics and information identifying the database issue;
    identifying, based on the database issue, a first remediation execution system of a plurality of remediation execution systems;
    transmitting the at least one notification communication to the first remediation execution system; and
    responsive to the at least one notification communication, executing, by the remediation execution system, a remedial action comprising at least one of throttling an activity associated with the database instance or terminating a session associated with the database instance.

2. The method of claim 1, wherein the condition is satisfied when the database metric value is greater than or equal to a first threshold level value.

3. The method of claim 2, wherein the first threshold level value is associated with the user system.

4. The method of claim 1, wherein the database instance stores the dataset associated with the user system and one or more additional datasets associated with one or more additional user systems.

5. The method of claim 1, further comprising:
    maintaining a first set of threshold level values comprising a first plurality of threshold level values each corresponding to a respective database metric of a plurality of database metrics, wherein the first set of threshold level values are established in view of information associated with the user system; and
    maintaining a second set of threshold level values comprising a second plurality of threshold level values each corresponding to a respective database metric of the plurality of database metrics, wherein the second set of threshold level values are established in view of information associated with an additional user system having an additional dataset stored by the database instance.

6. The method of claim 1, further comprising determining the at least the portion of user action metrics from the set of user action metrics in view of one or more of the database issue and the first remediation execution system.

7. The method of claim 1, further comprising generating a diagnostic report comprising information identifying one or more of the database issue, the remedial action, the user system, the database issue, or the at least the portion of the user action metrics.

8. A system comprising:
    a processing device; and
    a memory coupled to the processing device, the memory having instructions stored thereon that, in response to execution by the processing device, cause the processing device to:
    poll a database instance to identify a database metric value associated with the database instance storing a dataset associated with a user system;
    determine the database metric value satisfies a condition indicating a database issue;
    in response to satisfaction of the condition, collect, from one or more data monitoring systems, a set of user action metrics identifying one or more database actions caused to be executed by the user system, wherein the set of user action metrics are collected based at least in part on a mapping with the database issue;
    generate at least one notification communication responsive to at least a portion of the set of user action metrics and information identifying the database issue;
    identify, based on the database issue, a first remediation execution system of a plurality of remediation execution systems;
    transmit the at least one notification communication to the first remediation execution system; and
    responsive to the at least one notification communication, execute, by the remediation execution system, a remedial action comprising at least one of throttling an activity associated with the database instance or terminating a session associated with the database instance.

9. The system of claim 8, wherein the condition is satisfied when the database metric value is greater than or equal to a first threshold level value.

10. The system of claim 9, wherein the first threshold level value is associated with the user system.

11. The system of claim 8, wherein the database instance stores the dataset associated with the user system and one or more additional datasets associated with one or more additional user systems.

12. The system of claim 8, the processing device to:
maintain a first set of threshold level values comprising a first plurality of threshold level values each corresponding to a respective database metric of a plurality of database metrics, wherein the first set of threshold level values are established in view of information associated with the user system; and
maintain a second set of threshold level values comprising a second plurality of threshold level values each corresponding to a respective database metric of the plurality of database metrics, wherein the second set of threshold level values are established in view of information associated with an additional user system having an additional dataset stored by the database instance.

13. The system of claim 8, the processing device to determine the at least the portion of user action metrics from the set of user action metrics in view of one or more of the database issue and the first remediation execution system.

14. The system of claim 8, the processing device to generate a diagnostic report comprising information identifying one or more of the database issue, the remedial action, the user system, the database issue, or the at least the portion of the user action metrics.

15. A non-transitory computer-readable storage medium having instructions encoded thereon which, when executed by a processing device, cause the processing device to:
poll a database instance to identify a database metric value associated with the database instance storing a dataset associated with a user system;
determine the database metric value satisfies a condition indicating a database issue;
in response to satisfaction of the condition, collect, from one or more data monitoring systems, a set of user action metrics identifying one or more database actions caused to be executed by the user system, wherein the set of user action metrics are collected based at least in part on a mapping with the database issue;
generate at least one notification communication responsive to at least a portion of the set of user action metrics and information identifying the database issue;
identifying, based on the database issue, a first remediation execution system of a plurality of remediation execution systems;
transmitting the at least one notification communication to the first remediation execution system; and
responsive to the at least one notification communication, execute, by the remediation execution system, a remedial action comprising at least one of throttling an activity associated with the database instance or terminating a session associated with the database instance.

16. The non-transitory computer-readable storage medium of claim 15, wherein the condition is satisfied when the database metric value is greater than or equal to a first threshold level value.

17. The non-transitory computer-readable storage medium of claim 16, wherein the first threshold level value is associated with the user system.

18. The non-transitory computer-readable storage medium of claim 15, the processing device to determine the at least the portion of user action metrics from the set of user action metrics in view of one or more of the database issue and the first remediation execution system.

19. The non-transitory computer-readable storage medium of claim 15, wherein the database instance stores the dataset associated with the user system and one or more additional datasets associated with one or more additional user systems.

20. The non-transitory computer-readable storage medium of claim 15, the processing device to:
maintain a first set of threshold level values comprising a first plurality of threshold level values each corresponding to a respective database metric of a plurality of database metrics, wherein the first set of threshold level values are established in view of information associated with the user system; and
maintain a second set of threshold level values comprising a second plurality of threshold level values each corresponding to a respective database metric of the plurality of database metrics, wherein the second set of threshold level values are established in view of information associated with an additional user system having an additional dataset stored by the database instance.

* * * * *